US010811011B2

United States Patent
Blanco (10) Patent No.: US 10,811,011 B2
(45) Date of Patent: Oct. 20, 2020

(54) CORRECTING FOR IMPULSE NOISE IN SPEECH RECOGNITION SYSTEMS

(71) Applicant: MOTOROLA SOLUTIONS, INC., Chicago, IL (US)

(72) Inventor: Alejandro G. Blanco, Fort Lauderdale, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 120 days.

(21) Appl. No.: 16/197,981

(22) Filed: Nov. 21, 2018

(65) Prior Publication Data

US 2020/0160859 A1 May 21, 2020

(51) Int. Cl.
*G10L 15/22* (2006.01)
*G10L 15/04* (2013.01)
*G10L 15/18* (2013.01)
*G10L 25/84* (2013.01)

(52) U.S. Cl.
CPC .............. *G10L 15/22* (2013.01); *G10L 15/04* (2013.01); *G10L 15/1815* (2013.01); *G10L 25/84* (2013.01)

(58) Field of Classification Search
CPC ......... G10L 15/22; G10L 25/84; G10L 15/04; G10L 15/1815
See application file for complete search history.

(56) References Cited

U.S. PATENT DOCUMENTS

| 7,809,569 | B2 | 10/2010 | Attwater et al. |
| 7,912,192 | B2 | 3/2011 | Kealy et al. |
| 8,443,049 | B1 | 5/2013 | Geddes |
| 2002/0106059 | A1 | 8/2002 | Kroll et al. |
| 2012/0042386 | A1 | 2/2012 | Backer |
| 2014/0278389 | A1 | 9/2014 | Zurek et al. |
| 2016/0063998 | A1* | 3/2016 | Krishnamoorthy ..... G10L 15/02 704/254 |
| 2016/0098992 | A1* | 4/2016 | Renard .................... G10L 15/30 704/275 |
| 2016/0239496 | A1 | 8/2016 | Motte et al. |
| 2020/0043519 | A1* | 2/2020 | Ramos ................ G10L 21/0208 |

* cited by examiner

*Primary Examiner* — Stella L. Woo
(74) *Attorney, Agent, or Firm* — Michael Best & Friedrich LLP (57) ABSTRACT

System and method for correcting for impulse noise in speech recognition systems. One example system includes a microphone, a speaker, and an electronic processor. The electronic processor is configured to receive an audio signal representing an utterance. The electronic processor is configured to detect, within the utterance, the impulse noise, and, in response, generate an annotated utterance including a timing of the impulse noise. The electronic processor is configured to segment the annotated utterance into silence, voice content, and other content, and, when a length of the other content is greater than or equal to an average word length for the annotated utterance, determine, based on the voice content, an intent portion and an entity portion. The electronic processor is configured to generate a voice prompt based on the timing of the impulse noise and the intent portion and/or the entity portion, and to play the voice prompt.

20 Claims, 6 Drawing Sheets

CORRECTING FOR IMPULSE NOISE IN SPEECH RECOGNITION SYSTEMS

BACKGROUND OF THE INVENTION

First responders (including firefighters, police officers, and paramedics, among others) use tablets, laptops, phones (for example, cellular or satellite), mobile (vehicular) or portable (personal) two-way radios, and other communication devices in the performance of their duties. Using such devices, first responders are able to access information and resources that aid them in making more informed determinations regarding actions to take and possible resolutions to situations, among other possibilities. For example, first responders can access vehicle histories, arrest records, outstanding warrants, health information, real-time traffic or other situational status information, and other relevant information.

Many such communication devices further comprise, or provide access to, electronic digital assistants (or sometimes referenced as "virtual partners") that may provide the user thereof with valuable information in an automated (for example, without further user input) or semi-automated (for example, with some further user input) fashion. The valuable information provided to the user may be based on explicit requests for such information posed by the user via an input (for example, such as a parsed natural language input or an electronic touch interface manipulation associated with an explicit request) in which the electronic digital assistant may reactively provide such requested valuable information.

As some existing examples, electronic digital assistants such as Siri™ provided by Apple, Inc. and Google Assistant™ provided by Google LLC, are software applications running on underlying electronic hardware that are capable of understanding natural language, and may complete electronic tasks in response to user voice inputs, among other additional or alternative types of inputs. These electronic digital assistants may perform such tasks as taking and storing voice dictation for future reference and retrieval, reading a received text message or an e-mail message aloud, generating a text message or e-mail message reply, looking up requested phone numbers and initiating a phone call to a requested contact, generating calendar appointments and providing appointment reminders, warning users of nearby dangers such as traffic accidents or environmental hazards, and providing many other types of information in a reactive or proactive manner.

BRIEF DESCRIPTION OF THE SEVERAL VIEWS OF THE DRAWINGS

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

First responders use electronic digital assistants during the performance of their duties, for example, by using voice commands to automatically access remote services. For example, a law enforcement officer, using his or her voice, may query an incident database to gather information relevant to an incident response. An electronic digital assistant receives an utterance from a user. An utterance is a phrase vocalized by the user, which includes an intent (for example, search for a license plate) and one or more entities (for example, the letters or numbers of a license plate to be searched). The electronic digital assistant analyzes the utterance using automated speech recognition and natural language processing to determine, for example, which service to access, which command to execute, or which database to query. First responders are often performing their duties outdoors, in crowded areas, or in environments that are otherwise noisy. Acoustic noise other than the user's utterance is sensed by the electronic digital assistant, and can interfere with the automated speech recognition, causing portions, and possibly key words, of the utterance to be missed.

Steady background noise (for example, wind, crowd noise, road noise, and the like) can be compensated for continuously, for example, by subtracting the background noise using samples taken when the user is not speaking. However, temporary loud sounds other than the first responder's voice (referred to as impulse noises) cannot be compensated for in this manner. Examples of impulse noise include a gunshot, a door slamming, a car horn, a siren, another speaker yelling or screaming, a passing vehicle, and the like.

Impulse noise can mask a key part of the utterance (for example, a key word or phrase). This may cause a failure of the natural language processing of the electronic digital assistant (for example, the inability to determine the user intent, or some of the entities being provided). This is especially a problem with longer utterances. Because an utterance is not understood, the electronic digital assistant may ask the first responder to repeat their entire utterance. This repetition consumes valuable time. Such delay may be especially disadvantageous when the service or information requested by the first responder includes information that could affect the safety of the first responder or others. Additionally, existing systems for prompting a user for a missing entity operate under the assumption the user did not provide it. In such systems, entities are marked as required. However, if a use case has a cause for a repeating entity of variable length, for example, a string of ID numbers and letters, then systems have difficulty marking those entities as required because of the variable number of entities.

Furthermore, the electronic digital assistant wastes resources such as battery life and processing capabilities by requesting and reprocessing entire utterances. Accordingly, there is a technological problem with respect to the interaction between a user (for example, an officer) that provides a service request (via an utterance) to an electronic digital assistant and a user interface of the electronic digital assistant that provides a response to the service request, namely that impulse noise can cause delays in processing and increased demands on processing resources.

As a consequence, systems and methods are presented herein for correcting for impulse noise in speech recognition systems. Using such embodiments, utterances are annotated when impulse noises are detected. Rather than abandoning a received utterance that has been subject to an impulse noise, in some embodiments electronic digital assistants use the annotated utterances to generate clarifying voice prompts. The voice prompts intelligently ask the user to confirm or to repeat words from the utterances affected by the impulse noise. When possible, embodiments save a user from having to repeat the entire utterance. Such embodiments address the above-noted technological problems by improving the interaction between a user (for example, a public safety officer) that provides a request to an electronic digital assistant and a user interface of the electronic digital assistant that provides a response to the request. Intelligent clarifying voice prompts to the user reduce the amount of repeated utterances from the user to the electrical digital assistant. Preserving the understood portions of the utterance is particularly useful in noisy environments, where a repeated utterance may also be affected by an impulse noise. This reduction of repeated communication improves user interaction with the electronic digital assistant. Such embodiments also provide a much-improved user experience for handling missed entities due to noise masking one of a number of repeating variable-length entities. Additionally, the reduction also improves the functionality of the electronic digital assistant itself by allowing a device implementing the electronic digital assistant to use less battery and processing capabilities due to the reduction in the reception and processing of repeated utterances from the user.

One example embodiment provides a system for correcting for impulse noise in speech recognition systems. The system includes a microphone, a speaker, and an electronic processor. The electronic processor is communicatively coupled to the microphone and the speaker, and configured to receive, via the microphone, an audio signal representing an utterance. The electronic processor is configured to detect, within the utterance, the impulse noise. The electronic processor is configured to, in response to detecting the impulse noise, generate an annotated utterance including a timing of the impulse noise. The electronic processor is configured to segment the annotated utterance into silence, voice content, and other content. When a length of the other content is greater than or equal to an average word length for the annotated utterance, the electronic processor is configured to determine, based on the voice content, an intent portion of the annotated utterance and an entity portion of the annotated utterance. The electronic processor is configured to generate a voice prompt based on the timing of the impulse noise and at least one of the group consisting of a timing of the intent portion and a timing of the entity portion. The electronic processor is configured to play the voice prompt via the speaker.

Another example embodiment provides a method for correcting for impulse noise in speech recognition systems. The method includes receiving, via a microphone communicatively coupled to an electronic processor, an audio signal representing an utterance. The method includes detecting, with the electronic processor, the impulse noise within the utterance. The method includes, in response to detecting the impulse noise, generating, with the electronic processor, an annotated utterance including a timing of the impulse noise. The method includes segmenting, with the electronic processor, the annotated utterance into silence, voice content, and other content. When a length of the other content is greater than or equal to an average word length for the annotated utterance, the method includes determining, with the electronic processor, based on the voice content, an intent portion of the annotated utterance and an entity portion of the annotated utterance. The method includes generating, with the electronic processor, a voice prompt based on the timing of the impulse noise and at least one of the group consisting of a timing of the intent portion and a timing of the entity portion. The method includes playing, with the electronic processor, the voice prompt via a speaker communicatively coupled to the electronic processor.

Each of the above-mentioned embodiments are discussed in more detail below, beginning with example communication system and device structures, in which the embodiments may be practiced. An illustration of an example method correcting for impulse noise in speech recognition systems (for example, as used in electronic digital assistants) follows. For ease of description, some or all of the example systems and devices presented herein are illustrated with a single exemplar of each of their component parts. Some examples may not describe or illustrate all components of the systems or devices. Other example embodiments may include more or fewer of each of the illustrated components, may combine some components, or may include additional or alternative components.

1. Communication System and Device Structures a. Communication System Structure

Figure 1A:
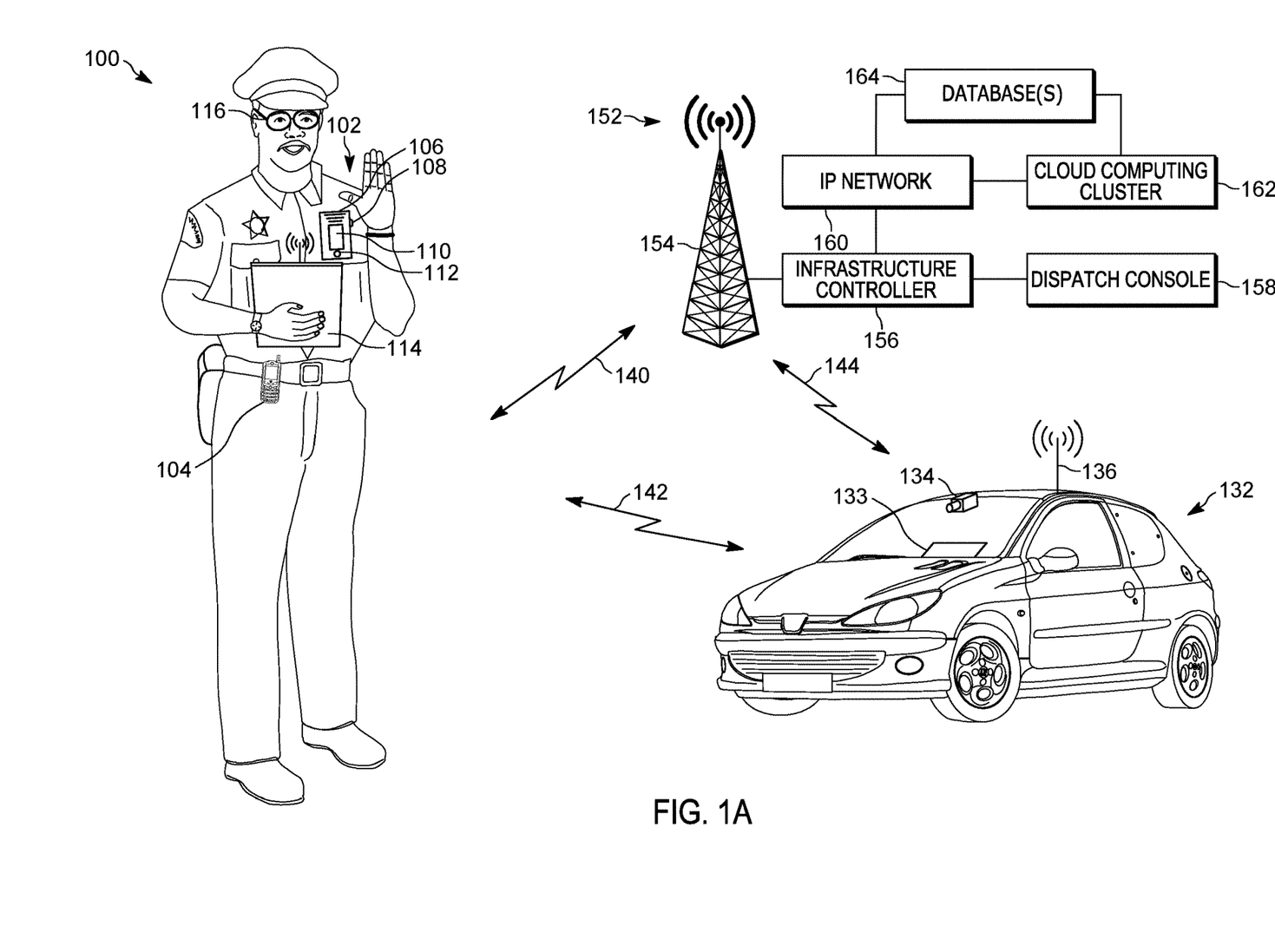
FIGS. 1A and 1B are system diagrams illustrating a communications system including speech recognition capabilities in accordance with some embodiments.
Figure 1B:
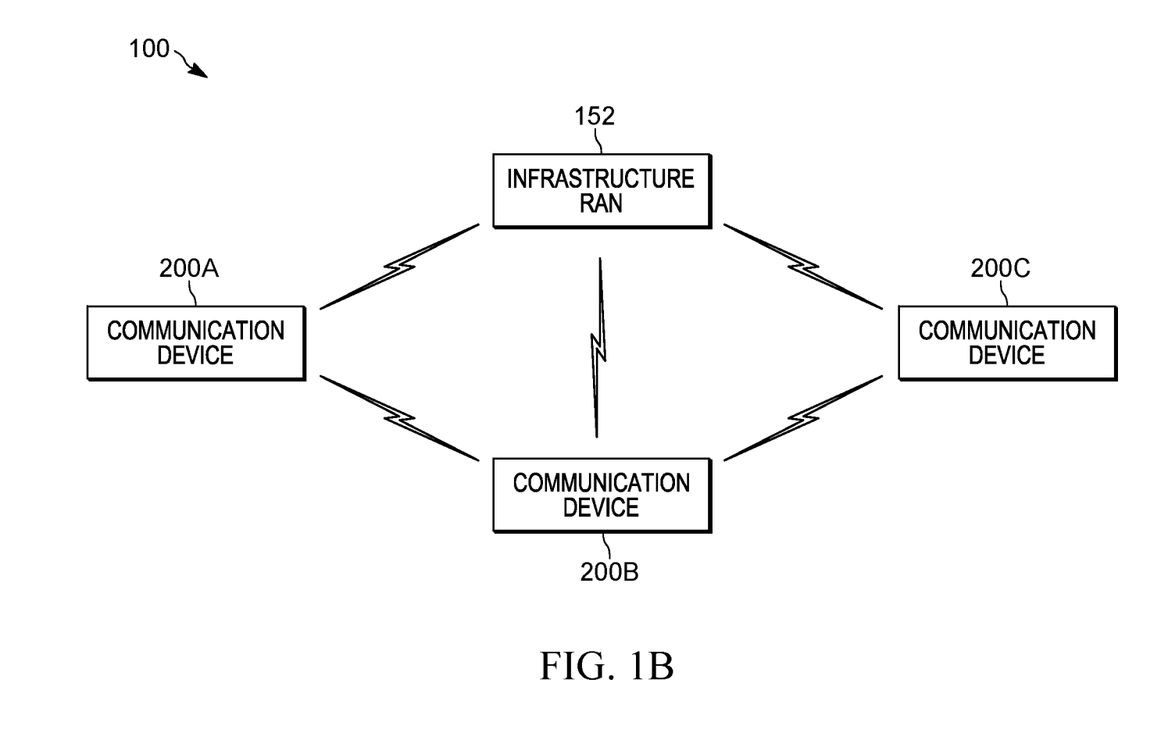

Referring now to the drawings, and in particular FIG. 1A, a communication system diagram illustrates a system 100. The system 100 includes a first set of devices that a user 102 (illustrated in FIG. 1A as a first responder police officer) may wear. The set of devices includes a primary battery-powered portable radio 104 used for narrowband and/or broadband direct-mode or infrastructure communications, a battery-powered radio speaker microphone (RSM) video capture device 106, a laptop 114 having an integrated video camera and used for data applications (for example, incident support applications), and/or smart glasses 116 (for example, which may be virtual reality, augmented reality, or mixed reality glasses). Although FIG. 1A illustrates only a single user 102 with a respective first set of devices, in other embodiments, the single user 102 may include additional sets of same or similar devices, and additional users may be present with respective additional sets of same or similar devices as indicated by FIG. 1B.

The system 100 may also include a vehicle 132 associated with the user 102. The vehicle 132 includes an integrated mobile communication device 133, an associated vehicular video camera 134, and a coupled vehicular transceiver 136. As an example, FIG. 1A illustrates only a single vehicle 132 with a single mobile communication device 133, respective single vehicular video camera 134 and/or microphone, and a single coupled vehicular transceiver 136. In other embodiments, the vehicle 132 may include additional same or similar mobile communication devices, video cameras, microphones, and/or transceivers, and additional vehicles may be present with respective additional sets of mobile communication devices, video cameras, microphones, and/or transceivers.

Each of the portable radio 104, RSM video capture device 106, laptop 114, and vehicular mobile communication device 133 may be capable of directly wirelessly communicating via direct-mode wireless link(s) 142, and/or may be capable of wirelessly communicating via a wireless infrastructure radio access network (RAN) 152 over respective wireless link(s) 140, 144 and via corresponding transceiver circuits. These devices may be referred to as communication devices and are configured to receive inputs associated with the user 102 and/or provide outputs to the user 102 in addition to communicating information to and from other communication devices and the infrastructure RAN 152.

The portable radio 104, in particular, may be any communication device used for infrastructure RAN or direct-mode media (for example, voice, audio, video, etc.) communication via a long-range wireless transmitter and/or transceiver that has a transmitter transmit range on the order of miles, for example, 0.5-50 miles, or 3-20 miles (for example, in comparison to a short-range transmitter such as a Bluetooth™ ZigBee™, or NFC transmitter) with other communication devices and/or the infrastructure RAN 152.

In the example of FIG. 1A, the portable radio 104 may form the hub of communication connectivity for the user 102, through which other accessory devices, for example, an activity tracker, a heads-up-display (for example, the smart glasses 116), the RSM video capture device 106, and/or the laptop 114 may communicatively couple. However, in some embodiments, these accessory devices additionally or alternatively include their own transceivers for infrastructure RAN or direct-mode media communication.

In order to communicate with and exchange video, audio, and other media and communications with the RSM video capture device 106, laptop 114, and/or smart glasses 116, the portable radio 104 may contain one or more physical electronic ports (such as a USB port, an Ethernet port, an audio jack, etc.) for direct electronic coupling with the RSM video capture device 106, laptop 114, and/or smart glasses 116. In some embodiments, the portable radio 104 may contain a short-range transmitter (for example, in comparison to the long-range transmitter such as a LMR or Broadband transmitter) and/or transceiver for wirelessly coupling with the RSM video capture device 106, laptop 114, and/or smart glasses 116. The short-range transceiver may be a Bluetooth™, ZigBee™, or NFC transmitter having a transmit range on the order of 0.01-100 meters, or 0.1-10 meters. In other embodiments, the RSM video capture device 106, the laptop 114, and/or the smart glasses 116 may contain their own long-range transceivers and may communicate with one another and/or with the infrastructure RAN 152 or vehicular transceiver 136 directly without passing through portable radio 104.

The RSM video capture device 106 provides voice functionality features similar to a traditional RSM, including one or more of acting as a remote microphone that is closer to the mouth of the user 102, providing a remote speaker allowing playback of audio closer to the ear of the user 102, and including a PTT switch or another type of PTT input. The voice and/or audio recorded at the remote microphone may be provided to the portable radio 104 for storage and/or analysis or for further transmission to other mobile communication devices or the infrastructure RAN 152, or may be directly transmitted by the RSM video capture device 106 to other communication devices or to the infrastructure RAN 152. The voice and/or audio played back at the remote speaker may be received from the portable radio 104 or received directly from one or more other communication devices or the infrastructure RAN 152. The portable radio 104 and/or RSM video capture device 106 may form part of a group communications architecture that allows a single communication device to communicate with one or more group members (not shown) associated with a particular group of devices at a same time.

Additional features may be provided at the RSM video capture device 106 as well. For example, a display screen 110 may be provided for displaying images, video, and/or text to the user 102 or to someone else. The display screen 110 may be, for example, a liquid crystal display (LCD) screen or an organic light emitting display (OLED) display screen. In some embodiments, a touch sensitive input interface may be incorporated into the display screen 110 as well, allowing the user 102 to interact with content provided on the display screen 110. A soft PTT input may also be provided, for example, via such a touch interface.

A video camera 112 may also be provided at the RSM video capture device 106, integrating an ability to capture images and/or video and store the captured image data (for further analysis) or transmit the captured image data as an image or video stream to the portable radio 104 and/or to other communication devices or to the infrastructure RAN 152 directly. The video camera 112 and RSM remote microphone may be used, for example, for capturing audio and/or video of a field-of-view associated with the user 102, perhaps including a suspect and the suspect's surroundings, storing the captured image and/or audio data for further analysis or transmitting the captured audio and/or video data as an audio and/or video stream to the portable radio 104 and/or to other communication devices or to the infrastructure RAN 152 directly for further analysis. An RSM remote microphone of the RSM video capture device 106 may be an omni-directional or unidirectional microphone or array of omni-directional or unidirectional microphones capable of identifying a direction from which a captured sound emanated.

In some embodiments, the RSM video capture device 106 may be replaced with a more limited body worn camera that may include the video camera 112 and/or microphone noted above for capturing audio and/or video, but may forego one or more of the features noted above that transform the body worn camera into a more full featured RSM, such as the separate physical PTT switch 108 and the display screen 110, and remote microphone functionality for voice communications in cooperation with portable radio 104.

While communication devices such as the portable radio 104 and the RSM video capture device 106 are explained in detail above, the other communication devices shown in FIG. 1A may be used for the same or similar purposes and may have the same or similar elements. For example, the functionality and elements described above with respect to the portable radio 104 and/or the RSM video capture device apply to one or more of the laptop 114, the smart glasses 116, and the mobile communication device 133. In some embodiments, the mobile communication device 133, the vehicular video camera 134 and/or microphone, and the vehicular transceiver 136 all may be coupled to one another via a wired and/or wireless vehicle area network (VAN), perhaps along with other sensors physically or communicatively coupled to the vehicle 132.

The portable radio 104, RSM video capture device 106, laptop 114, and/or smart glasses 116 may form a personal area network (PAN) via corresponding short-range PAN transceivers, which may be based on a Bluetooth™, Zig-Bee™ Bluetooth™ Low Energy, Wi-Fi, Near Field Communication (NFC), Radio Frequency ID (RFID), other short-range wireless protocols, or combinations of the foregoing.

In some embodiments, one or more communication devices (for example, the portable radio 104, the RSM video capture device 106, and/or the mobile communication device 133) includes a location determination device. The location determination device may be integrated with or separately disposed in the portable radio 104 and/or the RSM 106 and/or in respective receivers, transmitters, or transceivers of the portable radio 104 and RSM 106 for determining a location of the portable radio 104 and RSM 106. In some embodiments, the location determination device is, for example, a global positioning system (GPS) receiver or wireless triangulation logic using a wireless receiver or transceiver and a plurality of wireless signals received at the wireless receiver or transceiver from different locations, among other possibilities. The location determination device may also include an orientation sensor for determining an orientation that the device is facing. Each orientation sensor may include a gyroscope and/or a magnetometer. Other types of orientation sensors could be used as well. The location may then be stored locally or transmitted via the transmitter or transceiver to other communication devices and/or to the infrastructure RAN 152.

The vehicle 132 may be a human-operable vehicle, or may be a self-driving vehicle operable under control of the mobile communication device 133 perhaps in cooperation with video camera 134 (which may include a visible-light camera, an infrared camera, a time-of-flight depth camera, and/or a light detection and ranging (LiDAR) device). In some embodiments, devices within the vehicle 132 may communicate with devices in other vehicles via a Vehicle-to-Vehicle (V2V) network.

Although the RSM 106, the laptop 114, and the vehicle 132 are illustrated in FIG. 1A as providing example video cameras and/or microphones for use in capturing audio and/or video streams, other types of cameras and/or microphones could be used as well, including but not limited to, fixed or pivotable video cameras secured to lamp posts, automated teller machine (ATM) video cameras, other types of body worn cameras such as head-mounted cameras, other types of vehicular cameras such as roof-mounted cameras, or other types of audio and/or video recording devices accessible via a wired or wireless network interface.

In some embodiments, one or more of the vehicle 132, the portable radio 104, the RSM video capture device 106, and any other device in FIG. 1A may be equipped with an environmental sensor such as a chemical, biological, radiological, nuclear, or explosive (CBRNE) sensor. Measurements made by the CBRNE sensor may be stored locally or transmitted via a transmitter or transceiver to other communication devices and/or to the infrastructure RAN 152.

Infrastructure RAN 152 is a radio access network that provides for radio communication links to be arranged within the network between a plurality of user terminals. Such user terminals may be portable, mobile, or stationary and may include any one or more of the communication devices illustrated in FIG. 1A, among other possibilities. At least one other terminal, for example used in conjunction with the communication devices, may be a fixed terminal, for example a base station, eNodeB, repeater, and/or access point. Such a RAN typically includes a system infrastructure that generally includes a network of various fixed terminals, which are in direct radio communication with the communication devices. Each of the fixed terminals operating in the RAN 152 may have one or more transceivers which may, for example, serve communication devices in a given region or area, known as a 'cell' or 'site', by radio frequency (RF) communication. The communication devices that are in direct communication with a particular fixed terminal are said to be served by the fixed terminal. In one example, all radio communications to and from each communication device within the RAN 152 are made via respective serving fixed terminals. Sites of neighboring fixed terminals may be offset from one another and may provide corresponding non-overlapping or partially or fully overlapping RF coverage areas.

Infrastructure RAN 152 may operate according to an industry standard wireless access technology such as, for example, an LTE, LTE-Advance, or 5G technology over which an OMA-PoC, a VoIP, an LTE Direct or LTE Device to Device, or a PoIP application may be implemented. Additionally or alternatively, infrastructure RAN 152 may implement a WLAN technology such as Wi-Fi perhaps operating in accordance with an IEEE 802.11 standard (for example, 802.11a, 802.11b, 802.11g) or such as a WiMAX perhaps operating in accordance with an IEEE 802.16 standard.

Infrastructure RAN 152 may additionally or alternatively operate according to an industry standard LMR wireless access technology such as, for example, the P25 standard defined by the APCO, the TETRA standard defined by the ETSI, the dPMR standard also defined by the ETSI, or the DMR standard also defined by the ETSI. Because these systems generally provide lower throughput than the broadband systems, they are sometimes designated narrowband RANs.

The infrastructure RAN 152 is illustrated in FIG. 1A as providing coverage for the portable radio 104, RSM video capture device 106, laptop 114, smart glasses 116, and/or vehicular transceiver 136 via a single fixed terminal 154 coupled to a single infrastructure controller 156 (for example, a radio controller, call controller, PTT server, zone controller, MME, BSC, MSC, site controller, Push-to-Talk controller, or other network device) and including a dispatch console 158 operated by a dispatcher. In other embodiments, additional fixed terminals and additional controllers may be disposed to support a larger geographic footprint and/or a larger number of mobile devices.

The infrastructure controller 156 illustrated in FIG. 1A, or some other back-end infrastructure device or combination of back-end infrastructure devices existing on-premises or in the remote cloud computing cluster 162 accessible via the IP network 160 (such as the Internet), may additionally or alternatively operate as a back-end electronic digital assistant, a back-end audio and/or video processing device, and/or a remote cloud-based storage device consistent with the remainder of this disclosure.

The IP network 160 may comprise one or more routers, switches, LANs, WLANs, WANs, access points, or other network infrastructure, including but not limited to, the public Internet. The cloud computing cluster 162 may be comprised of a plurality of computing devices, one or more of which may be executing none, all, or a portion of an electronic digital assistant service, sequentially or in parallel, across the one or more computing devices. The one or more computing devices comprising the cloud computing cluster 162 may be geographically co-located or may be separately located, and inter-connected via electronic and/or optical interconnects. Although not shown in FIG. 1A, one or more proxy servers or load balancing servers may control which one or more computing devices perform any part or all of the electronic digital assistant service.

As shown in FIG. 1A, database(s) 164 may be accessible via the IP network 160 and/or the cloud computing cluster 162, and may include databases such as a long-term video storage database, a historical or forecasted weather database, an offender or criminal record database perhaps including facial recognition images to match against, a cartographic database of streets and elevations, a traffic database of historical or current traffic conditions, a vehicle database, a missing persons database, and a computer aided dispatch (CAD) incident database, or other types of databases. Databases 164 may further include all or a portion of the databases described herein as being provided at the infrastructure controller 156. In some embodiments, the databases 164 may be maintained by third parties (for example, the National Weather Service or a Department of Transportation, respectively). As shown in FIG. 1A, the databases 164 are communicatively coupled with the infrastructure RAN 152 to allow the communication devices (for example, the portable radio 104, the RSM video capture device 106, the laptop 114, and the mobile communication device 133) to communicate with and retrieve data from the databases 164 via infrastructure controller 156 and IP network 160. In some embodiments, the databases 164 are commercial cloud-based storage devices. In some embodiments, the databases 164 are housed on suitable on-premises database servers. The databases 164 of FIG. 1A are merely examples. In some embodiments, the system 100 additionally or alternatively includes other databases that store different information. In some embodiments, the databases 164 and/or additional or other databases are integrated with, or internal to, the infrastructure controller 156.

Finally, although FIG. 1A describes a communication system 100 generally as a public safety communication system that includes a user 102 generally described as a police officer and a vehicle 132 generally described as a police cruiser, in other embodiments, the communication system 100 may additionally or alternatively be a retail communication system including a user 102 that may be an employee of a retailer and a vehicle 132 that may be a vehicle for use by the user 102 in furtherance of the employee's retail duties (for example, a shuttle or self-balancing scooter). In other embodiments, the communication system 100 may additionally or alternatively be a warehouse communication system, a private security communication system, a medical communication system, a heavy machinery communication system, and the like.

As mentioned previously, many of the devices shown in FIG. 1A (for example, the portable radio 104, the RSM video capture device 106, the laptop 114, the mobile communication device 133, the infrastructure controller 156, the dispatch console 158, and one or more computing devices in the cloud computing cluster 162) may be referred to as communication devices (for example, a communication device 200 as explained below with respect to FIG. 2). Although FIG. 1A shows multiple communication devices 200 associated with the user 102, in some embodiments, the communication system 100 includes communication devices 200 of multiple users. For example, as shown in FIG. 1B, the communication device 200A is associated with a first user, the communication device 200B is associated with a second user, and the communication device 200C is associated with a third user. As indicated by FIG. 1B, in some embodiments, the communication devices 200A, 200B, and 200C communicate with each other over the infrastructure RAN 152 and/or communicate with each other directly as described previously herein. Similarly, other devices, such as the dispatch console 158, may communicate with communication devices 200 of multiple users through the infrastructure RAN 152. In some embodiments, one or more users may have multiple associated communication devices 200, for example, as shown in FIG. 1A.

b. Device Structure

Figure 2:
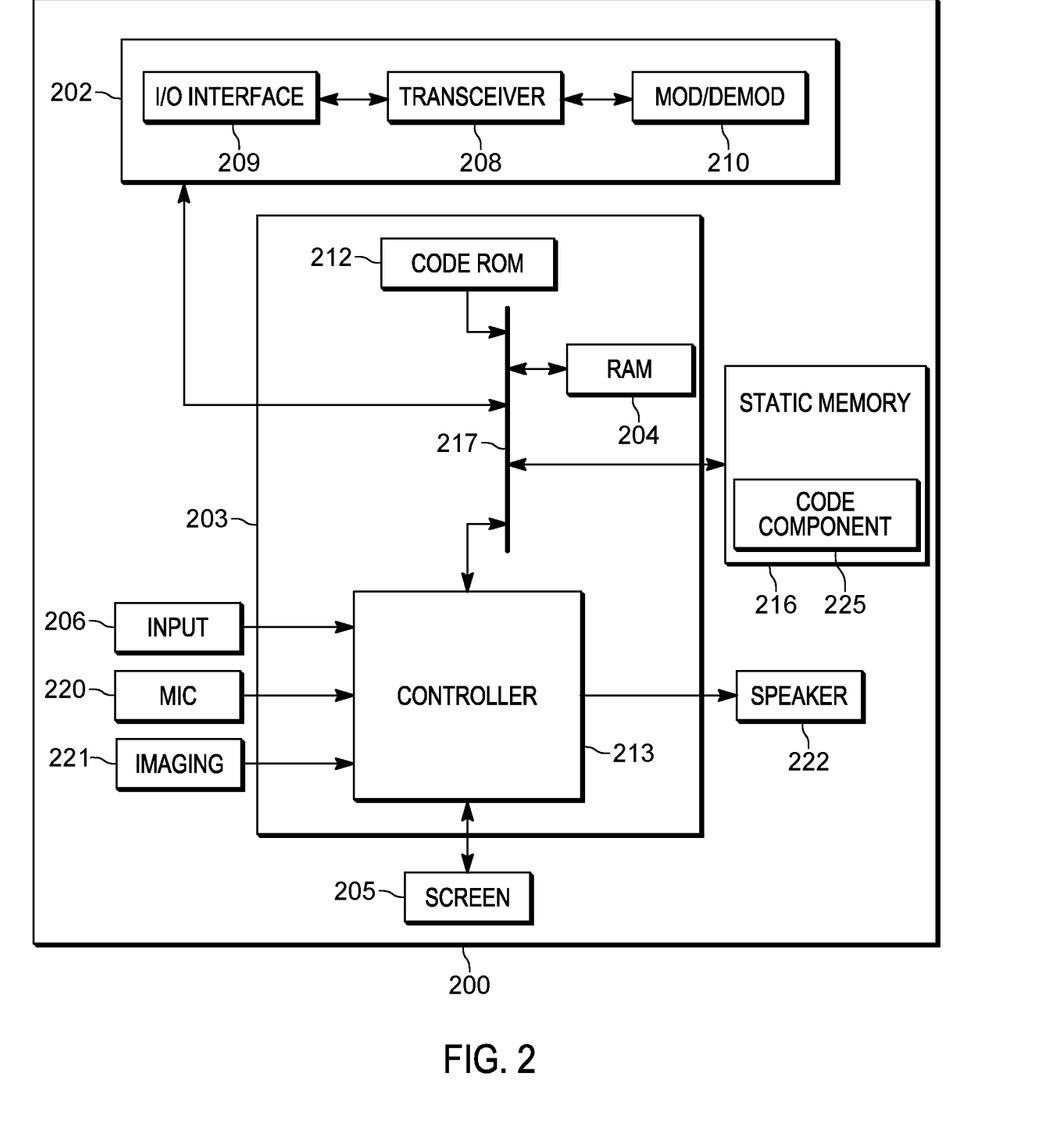
FIG. 2 is a device diagram showing a device structure of a communication device of the system of FIGS. 1A and 1B in accordance with some embodiments.

FIG. 2 sets forth a schematic diagram that illustrates a communication device 200 according to some embodiments of the present disclosure. The communication device 200 may be, for example, embodied in the portable radio 104, the RSM video capture device 106, the laptop 114, the mobile communication device 133, the infrastructure controller 156, the dispatch console 158, one or more computing devices in the cloud computing cluster 162, or some other communication device not illustrated in FIG. 1A, and/or may be a distributed communication device across two or more of the foregoing (or multiple of a same type of one of the foregoing) and linked via a wired and/or wireless communication link(s). In some embodiments, the communication device 200 (for example, the portable radio 104) may be communicatively coupled to other devices. In such embodiments, the combination of the portable radio 104 and the coupled device may be considered a single communication device 200. As another example, the mobile communication device 133 may be communicatively coupled to an occupant sensor of the vehicle 132, and the combination may be considered a single communication device 200.

While FIG. 2 represents the communication devices described above with respect to FIGS. 1A and 1B, depending on the type of the communication device, the communication device 200 may include fewer or additional components in configurations different from that illustrated in FIG. 2. For example, in some embodiments, the communication device 200 acting as the infrastructure controller 156 may not include one or more of the screen 205, microphone 220, imaging device 221, and speaker 222. As another example, in some embodiments, the communication device 200 acting as the portable radio 104 or the RSM video capture device 106 may further include a location determination device (for example, a global positioning system (GPS) receiver) as explained above. Other combinations are possible.

As shown in FIG. 2, the communication device 200 includes a communications unit 202 coupled to a common data and address bus 217 of a processing unit 203. The communication device 200 may also include one or more input devices (for example, keypad, pointing device, touch-sensitive surface, button, a microphone 220, an imaging device 221, and/or another input device 206) and an electronic display screen 205 (which, in some embodiments, may be a touch screen and thus also acts as an input device), each coupled to be in communication with the processing unit 203.

The microphone 220 may be present for capturing audio from a user and/or other environmental or background audio that is further processed by processing unit 203 in accordance with the remainder of this disclosure and/or is transmitted as voice or audio stream data, or as acoustical environment indications, by communications unit 202 to other portable radios and/or other communication devices. In some embodiments, the communication device 200 includes multiple microphones, or a multi-microphone array (for example, a broadside array or an end fire array), which are configured to produce a directional response (that is, a beam pattern) to pick up desirable sound waves, while attenuating undesirable sound waves. The imaging device 221 may provide video (still or moving images) of an area in a field of view of the communication device 200 for further processing by the processing unit 203 and/or for further transmission by the communications unit 202. A speaker 222 may be present for reproducing audio that is decoded from voice or audio streams of calls received via the communications unit 202 from other portable radios, from digital audio stored at the communication device 200, from other ad-hoc or direct mode devices, and/or from an infrastructure RAN device, or may playback alert tones or other types of pre-recorded audio.

The processing unit 203 may include a code Read Only Memory (ROM) 212 coupled to the common data and address bus 217 for storing data for initializing system components. The processing unit 203 may further include an electronic processor 213 (for example, a microprocessor) coupled, by the common data and address bus 217, to a Random Access Memory (RAM) 204 and a static memory 216.

The communications unit 202 may include one or more wired and/or wireless input/output (I/O) interfaces 209 that are configurable to communicate with other communication devices, for example, the portable radio 104, the laptop 114, the wireless RAN 152, and/or the mobile communication device 133.

For example, the communications unit 202 includes at least one transceiver 208. In some embodiments, the transceiver 208 is a wireless transceiver, configurable to communicate via one or more wireless radio networks. In some embodiments, the transceiver 208 is a wireline transceiver, for example, an Ethernet transceiver, a USB transceiver, or similar transceiver configurable to communicate via a physical connection to a wireline network. Embodiments may contain both wireless and wireline transceivers. The transceiver 208 is also coupled to a combined modulator/demodulator 210.

The electronic processor 213 is communicatively coupled to the display screen 205, the microphone 220, the imaging device 221, the other input device 206, and/or the speaker 222. Static memory 216 may store operating code 225 for the electronic processor 213 that, when executed, performs one or more of the steps set forth in FIG. 4 and the accompanying text. The static memory 216 may comprise, for example, a hard-disk drive (HDD), an optical disk drive, a solid-state drive (SSD), a flash memory drive, and the like.

2. Processes for Correcting for Impulse Noise

In some embodiments, an individual component and/or a combination of individual components of the system 100 may be referred to as an electronic computing device that implements an electronic digital assistant as mentioned above. For example, the electronic computing device may be the portable radio 104. In other embodiments, the electronic computing device includes multiple electronic processors distributed remotely from each other. For example, the electronic computing device may be implemented on a combination of at least two of the electronic processor 213 of the portable radio 104, the electronic processor 213 of the infrastructure controller 156, and the electronic processor 213 of a back-end device in the cloud computing cluster 162 accessible via an IP network 160.

Figure 3A:
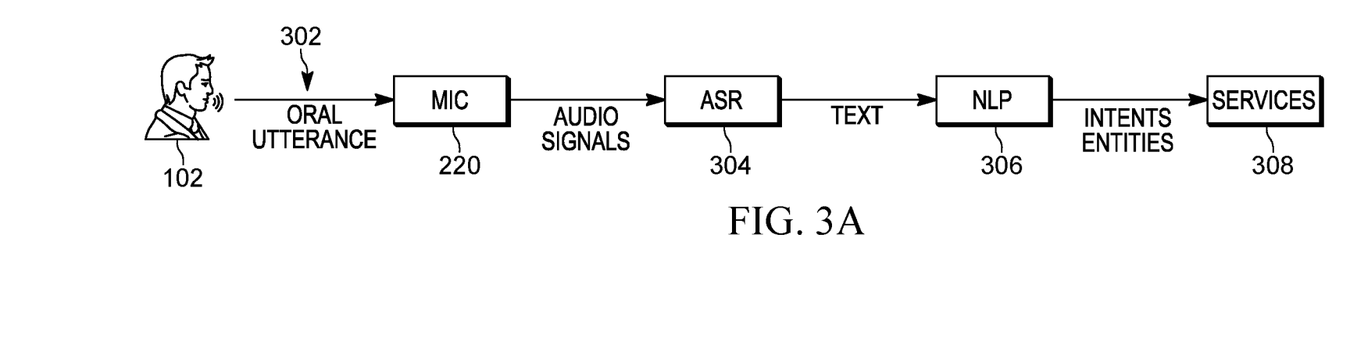
FIGS. 3A, 3B, and 3C illustrate the reception and processing of utterances in accordance with some embodiments.

In some embodiments, the user 102 uses an electronic digital assistant implemented by the electronic computing device by, for example, providing an utterance 302 that is received by the microphone 220 of the communication device 200, as illustrated in FIG. 3A. The electronic computing device (for example, the electronic processor 213) receives audio signals representative of the utterance from the microphone 220 and analyzes the audio signals to determine the content of the utterance. Based on the content, the electronic computing device performs the request contained in the utterance, and returns the requested information to the user 102 (for example, via audio presented on the speaker 222). In the illustrated embodiment, the electronic computing device includes an automatic speech recognition (ASR) engine 304, which receives the audio signals and outputs the content of the utterance as text. The electronic computing device also includes a natural language processing (NLP) engine 306 configured to determine the intent and/or content of the utterance by analyzing the text.

Figure 3B:
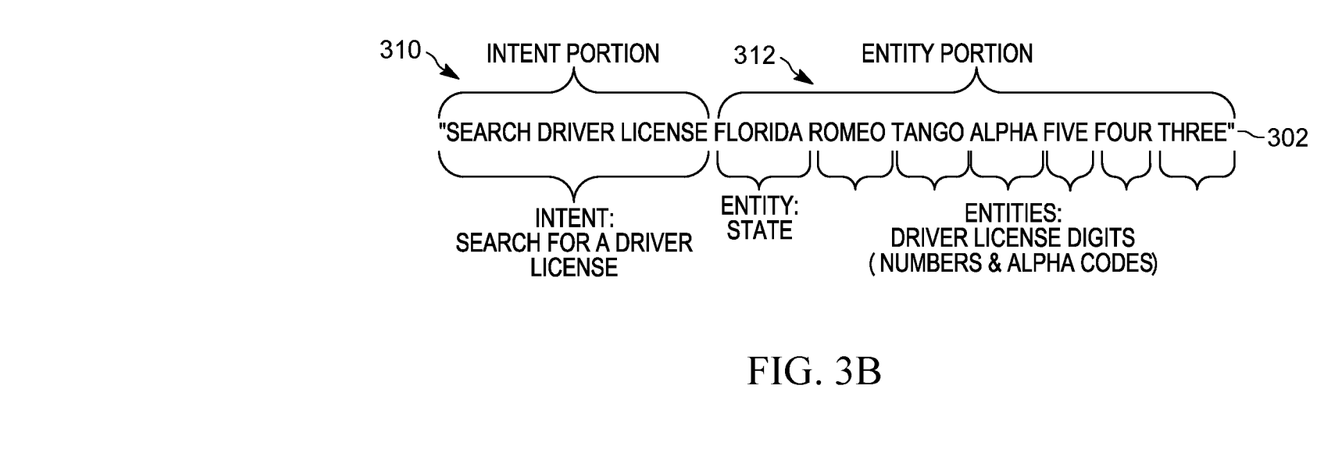

In one example, the user 102 is a police officer who wishes to search a driver license (for example, to gather information during a traffic stop). The user 102 speaks the utterance 302 into an electronic computing device (for example, the portable radio 104). As illustrated in FIG. 3B, the utterance 302 includes the words: "Search driver license Florida romeo tango alpha five four three." The NLP engine 306 determines an intent portion 310 and an entity portion 312 of the utterance 302. The intent is to search for a driver license. The entities detected include the state for the driver license (Florida), and letters and digits including in the driver license number (romeo tango alpha five four three).

Returning to FIG. 3A, in some embodiments, the electronic computing device includes a service 308 for determining a response to the utterance (for example, by using the intent and entity information to query a driver license database). The electronic computing device provides output to the user based on the response to the query (for example, via a generated audio response on the speaker 222 or a generated text-based response on the screen 205).

In some embodiments, the user utterance and/or the received information may relate to public safety information. For example, the user utterance and/or the received information may relate to a past or current public safety incident (for example, a building fire, a criminal pursuit or other law enforcement event, a natural disaster, a medical incident, a traffic accident, and the like) in which public safety officers (for example, firefighters, police officers, paramedics, and the like) engage to protect the public. For example, the received information may include a request for a back-up or a location to which a public safety officer should report. As another example, the user utterance and/or the received information may include other public safety-related information such as information relating to a criminal or information relating to a recommended public safety procedure.

Figure 3C:
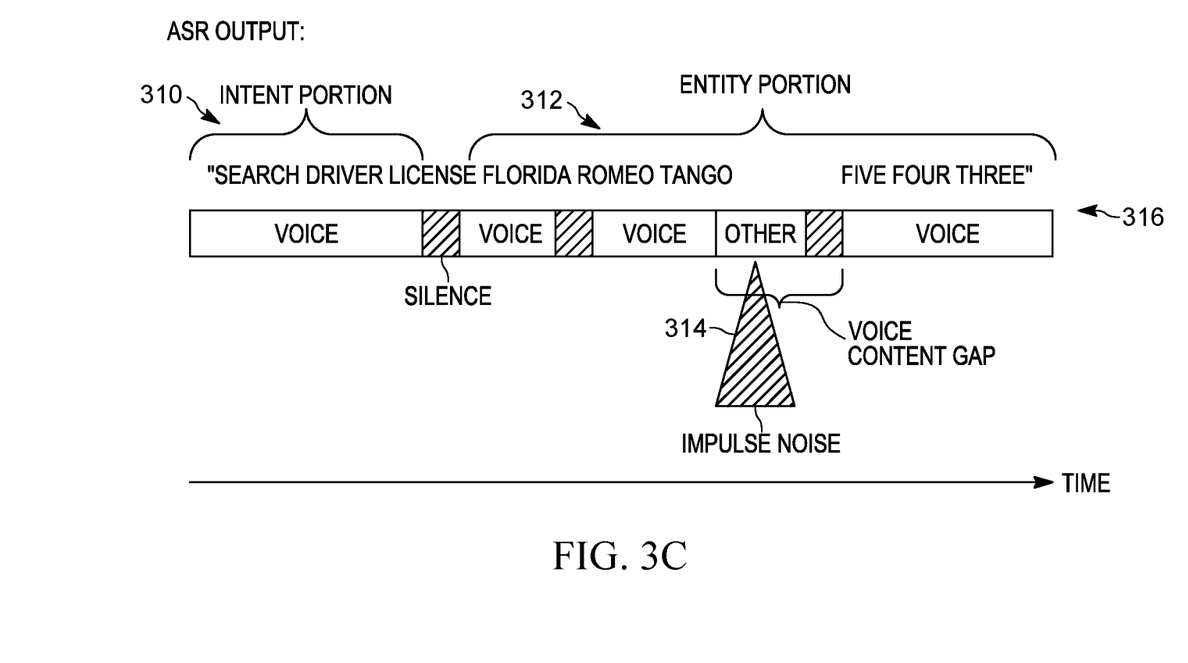

As noted, environmental noise, particularly impulse noises, may mask a key part of the utterance (for example, a key word of phrase). In such instances, the automated speech recognizer provides incomplete (as compared to the utterance intended by the user) information to the natural language processer. This may make it difficult for an electronic digital assistant to determine a meaning of the utterance or portions of the utterance. For example, as illustrated in FIG. 3C, an impulse noise 314 occurs when the user 102 is speaking the word "alpha," resulting in the ASR engine 304 failing to recognize the word. In this example, the NLP engine 306 is able to successfully determine the intent portion 310 (to search for a driver license), but such search may fail or provide inaccurate results due to the missing word in the entity portion 312. In another example, the intent portion 310 may be obscured, resulting the NLP engine 306 being able to correctly determine the entity portion 312, but not knowing what to do with the entities.

Figure 4:
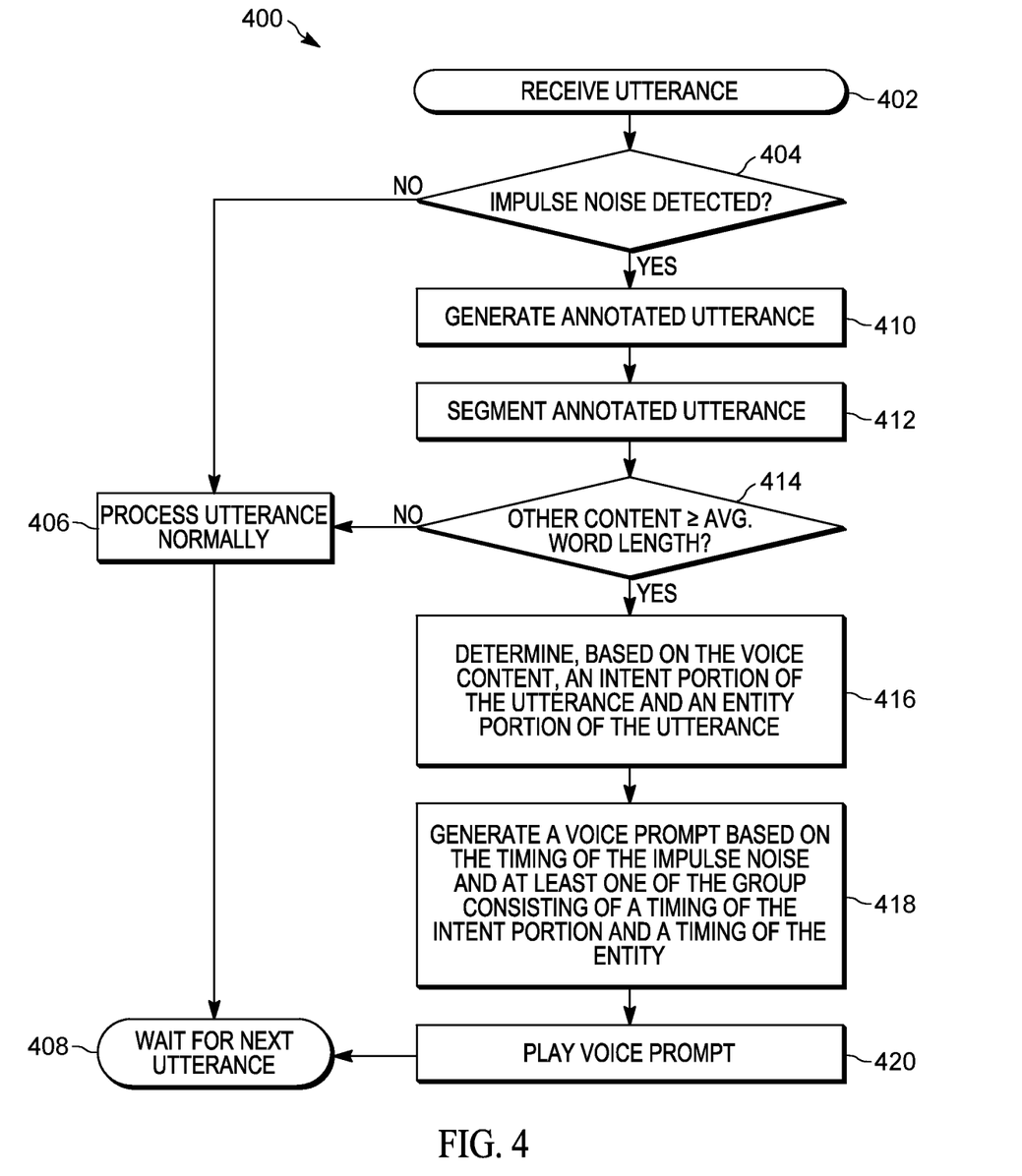
FIG. 4 illustrates a flow chart of a method for correcting for impulse noise in speech recognition systems processing utterances in accordance with some embodiments.

To address this technological problem with respect to the interaction between a user (for example, the user 102) and an electronic digital assistant, the electronic computing device that implements the electronic digital assistant, in one instance, employs a method 400 illustrated in FIG. 4. The method 400 addresses the above-noted technological problems by improving the interaction between a user that provides an utterance to an electronic digital assistant and a user interface of the electronic digital assistant that provides a response to the utterance.

FIG. 4 illustrates a flow chart diagram of the method 400 performed by the electronic computing device for correcting for impulse noise in speech recognition systems. While a particular order of processing steps, message receptions, and/or message transmissions is indicated in FIG. 4 as an example, timing and ordering of such steps, receptions, and transmissions may vary where appropriate without negating the purpose and advantages of the examples set forth in detail throughout this disclosure. Although the method 400 is described in terms of detecting and compensating for a single impulse noise, it should be noted that embodiments of the method 400 may be used to detect and compensate for multiple impulse noises in an utterance.

At block 402, the electronic processor 213 receives, via the microphone 220, an audio signal representing an utterance. At block 404, the electronic processor 213 determines whether an impulse noise is detected within the utterance. In some embodiments, the electronic processor 213 detects an impulse noise by analyzing one or more of the shape, spectral content, and received direction of sounds represented by the audio signals. For example, the shape of a portion of the audio signal may match shapes known to be produced by impulse noises. In another example, a sound may be considered an impulse noise when received from a direction apart from that of the utterance (for example, as detected by a microphone array). In another example, a sound may be considered an impulse noise simply by a having significantly raised audio level for a short time. In another example, a sound may be considered an impulse noise if recognized as having a different signature than the device owner (for example, another person shouting around the user). In another example, voice activity detection algorithms may be applied to the suspect time interval to see if a single voice is understood. In another example, the electronic processor 213 uses a machine learning engine to detect which sounds are noise and which sounds are normal voice. Such machine learning engines may be trained using labeled examples of impulse noises. When no impulse noise is detected, at block 406, the electronic computing device processes the utterance normally (for example, by passing the text from the ASR engine 304 to the NLP engine 306), and waits to receive and analyze another utterance, at block 408.

At block 410, in response to detecting the impulse noise, the electronic processor 213 generates an annotated utterance including a timing of the impulse noise. For example, as illustrated in FIG. 3C, the annotated utterance 316 is produced including a notation of the impulse noise 314 at the time it occurred during the utterance 302. For ease of description, the annotated utterance 316 is shown graphically. In actual practice, the annotated utterance 316 is stored in an electronic format, for example, a digitized audio file including metadata indicating the timing of the impulse noise 314.

At block 412, the electronic computing device segments the annotated utterance into silence, voice content, and other content. When a person speaks an utterance, he or she pauses between words or phrases. As illustrated in FIG. 3C, pauses of sufficient length are annotated as "silence." Portions of the annotated utterance that contain detected speech are annotated as "voice content." Portions of the annotated utterance that are too loud to be considered silence, yet do not contain sound recognized as speech, are annotated as "other content." For example, the portion of the annotated utterance at which the impulse noise occurs is annotated as "other content."

Other content may represent a gap in voice content, the gap indicating that some voice content of the utterance may have been missed. At block 414, the electronic computing device determines whether the other content is indicative of a gap in the voice content. When voice content precedes and follows other content, and the length of the other content is such that it may mask a word or words, it can be inferred that the other content is obscured voice content. As a consequence, in some embodiments, the electronic processor 213 determines whether the length of the other content is greater than or equal to an average word length for the utterance. In some embodiments, the electronic processor 213 generates the average word length for the utterance by dividing the total length of the voice content by a number of words for the utterance. In some embodiments, the number of words for the utterance is received from a speech recognizer (for example, the ASR engine 304). In some embodiments, average word length is tracked periodically or continuously for the user 102 as the user 102 provides utterances to the electronic digital assistant. In some embodiments, a machine learning engine may be applied to learn the average word length, or the probability of a masked voice content.

When the length of the other content is less than an average word length for the utterance, it can be inferred that there is likely no voice content missing from the utterance, despite the impulse noise being present. Accordingly, at block 414, when the length of the other content is not greater than or equal to an average word length for the utterance, the electronic processor 213, at block 406, processes the utterance normally (for example, by passing the text from the ASR engine 304 to the NLP engine 306), and waits to receive and analyze another utterance, at block 408.

When the length of the other content is greater than or equal to an average word length for the utterance (at block 414), the electronic processor 213, at block 416, determines, based on the voice content, an intent portion of the annotated utterance (for example, the intent portion 310) and an entity portion of the annotated utterance (for example, the entity portion 312). In some embodiments, the NLP engine 306 analyzes the annotated utterance to identify the intent and entity portions. An intent portion is a word or phrase that reflect the intent of the user's utterance. An entity portion is a word or words that represent data to be acted upon based on the user intent in the intent portion. For example, the words "Search driver license" reflect an intent to search for a driver license. Based on this intent, an electronic digital assistant would use the entity portion of the utterance as data for the search. In the example illustrated in FIG. 3B, the entity portion includes two types of entities: a state and driver license digits.

Because an impulse noise has been detected (at block 404) and the other content of the utterance is long enough that it may mask a word of the utterance (at block 414), the electronic digital assistant requires additional input from the user to complete the utterance so the request can be correctly processed. Where the impulse noise occurs determines how or what additional input will be requested from the user. Accordingly, at block 418, the electronic processor 213 generates a voice prompt based on the timing of the impulse noise and a timing of the intent portion, a timing of the entity, or both.

In some embodiments, the electronic processor 213 determines whether a user intent is recognized based on the intent portion of the utterance. For example, because the words "Search driver license" are present in the intent portion 310, the electronic processor 213 is able to determine that the words reflect an intent to search for a driver license.

In some embodiments, when the user intent is not recognized and the timing of the impulse noise corresponds to the timing of the intent portion, the voice prompt is generated to request that the user clarify his or her intent. In some embodiments, the electronic processor 213 determines a potential intent based on the entity portion of the annotated utterance and generates the voice prompt based on the potential intent. For example, the electronic processor 213 may determine that the entity portion corresponds to a data format used for driver licenses and generate a voice prompt including the words "I heard Florida alpha tango 432, did you say Search driver license?" In some embodiments, the voice prompt includes a request to repeat a word of the utterance based on the entity portion. For example, the electronic processor 213 may generate a voice prompt including the words "Please repeat the type of search requested."

In some embodiments, when the user intent is not recognized and the timing of the impulse noise does not correspond to the timing of the intent portion, the electronic processor 213 writes the entity portion of the utterance to a memory (for example, the static memory 216) to preserve potential entity data for further analysis. In such embodiments, the voice prompt includes a request to repeat the intent. For example, the electronic processor 213 may generate a voice prompt including the words "I heard Florida alpha tango 432, what do you want to do with this information?"

In the example illustrated in FIG. 3C, the impulse noise 314 has obscured the entity "alpha" of the entity portion 312. In some embodiments, when user intent is recognized and the timing of the impulse noise corresponds to the timing of the entity portion (as it does in this example), the electronic processor 213 generates the voice prompt to include a request to repeat a word of the utterance based on the entity portion. In some embodiments, the request to repeat a word of the utterance is based on a word immediately preceding the impulse noise, a word immediately following the impulse noise, or both. For example, the electronic processor 213 may generate a voice prompt including the words "What did you say after romeo tango?" In another example, the electronic processor 213 may generate a voice prompt including the words "What did you say between tango and five?" In some embodiments, the request to repeat a word of the utterance is based on a word identified based on the timing of the impulse noise and the entity portion. For example, the electronic processor 213 may generate a voice prompt including the words "What was the third license digit?"

In some instances, a user may compensate for the impulse noise by repeating a word or words of the utterance while speaking it the first time. Accordingly, in some embodiments, when the electronic processor 213 recognizes a user intent, it attempts to detect a possible repetition portion of the entity portion based on the timing of the impulse noise. In some embodiments, the electronic processor 213 detects the repetition by looking for partial phrases that match and/or a correcting connecting phrase. For example, in an annotated utterance including "date <impulse noise> fifty-three, that's date of birth Nov. 3, 1953," the presence of "date . . . fifty-three" twice with the first instance surrounding the impulse noise is an indicator that the second instance is a repetition of the first. The word "that's" is an example of a correcting connecting phrase. The presence of such a phrase near to an impulse noise further indicates that the words following the phrase are a repetition of the similar words surrounding the impulse noise. In this example, "date . . . fifty-three" is identified as a possible repetition portion. To account for the repetition, the electronic processor 213 generates an adjusted entity portion based on the entity portion and the possible repetition portion. In some embodiments, the electronic processor 213 generates the adjusted entity portion by removing an entity from the entity portion based on the possible repetition portion. For example, the electronic processor may remove "date <impulse noise> fifty-three, that's" to generate an adjusted entity portion including only the words "date of birth Nov. 3, 1953." By automatically removing the repeated words, the electronic processor 213 may not have to prompt the user for clarification. In some embodiments, when repeated words are removed, the voice prompt includes the adjusted entity portion and a request to confirm it. For example, the voice prompt may include the words "I heard 'date of birth Nov. 3, 1953.' Is that correct?"

Regardless of how the voice prompt is generated, at block 418, the electronic processor 213 plays the voice prompt via the speaker for the user 102.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

I claim:

1. A system for correcting for an impulse noise in speech recognition systems, the system comprising:
    a microphone;
    a speaker; and
    an electronic processor, communicatively coupled to the microphone and the speaker, and configured to
        receive, via the microphone, an audio signal representing an utterance;
        detect, within the utterance, the impulse noise;
        in response to detecting the impulse noise, generate an annotated utterance including a timing of the impulse noise;
        segment the annotated utterance into silence, voice content, and other content, wherein the other content indicates that some voice content of the utterance has been missed due to the impulse noise; and
        when a length of the other content is greater than or equal to an average word length for the annotated utterance,
            determine, based on the voice content, an intent portion of the annotated utterance and an entity portion of the annotated utterance;
            generate a voice prompt based on the timing of the impulse noise and at least one of the group consisting of a timing of the intent portion and a timing of the entity portion; and
            play the voice prompt via the speaker.

2. The system of claim 1, wherein the electronic processor is further configured to:
    generate the average word length for the annotated utterance by dividing a total length of the voice content by a number of words for the utterance.

3. The system of claim 2, wherein the number of words for the utterance is received from a speech recognizer.

4. The system of claim 1, wherein the electronic processor is further configured to:
    determine whether a user intent is recognized based on the intent portion; and
    when the user intent is not recognized and the timing of the impulse noise corresponds to the timing of the intent portion,
        determine a potential intent based on the entity portion; and
        generate the voice prompt based on the potential intent.

5. The system of claim 4, wherein the voice prompt includes a request to repeat a word of the utterance based on the entity portion.

6. The system of claim 4, further comprising:
    a memory communicatively coupled to the electronic processor,
    wherein the electronic processor is further configured to, when the user intent is not recognized and the timing of the impulse noise does not correspond to the timing of the intent portion, write the entity portion to the memory; and
    wherein the voice prompt includes a request to repeat the intent portion.

7. The system of claim 1, wherein the electronic processor is further configured to:
    determine whether a user intent can be recognized based on the intent portion; and
    when the user intent is recognized and the timing of the impulse noise corresponds to the timing of the entity portion, generate the voice prompt to include a request to repeat a word of the utterance based on the entity portion.

8. The system of claim 7, wherein the request to repeat a word of the utterance includes a request to repeat the word based on at least one of the group consisting of a word immediately preceding the impulse noise, a word immediately following the impulse noise, and a word identified based on the timing of the impulse noise and the entity portion.

9. The system of claim 1, wherein the electronic processor is further configured to:
   determine whether a user intent can be recognized based on the intent portion; and
   when the user intent is recognized,
   detect a possible repetition portion of the entity portion based on the timing of the impulse noise; and
   generate an adjusted entity portion based on the entity portion and the possible repetition portion.

10. The system of claim 9, wherein the electronic processor is configured to generate the adjusted entity portion by removing an entity from the entity portion based on the possible repetition portion.

11. A method for correcting for an impulse noise in speech recognition systems, the method comprising:
   receiving, via a microphone communicatively coupled to an electronic processor, an audio signal representing an utterance;
   detecting, with the electronic processor, the impulse noise within the utterance;
   in response to detecting the impulse noise, generating, with the electronic processor, an annotated utterance including a timing of the impulse noise;
   segmenting, with the electronic processor, the annotated utterance into silence, voice content, and other content, wherein the other content indicates that some voice content of the utterance has been missed due to the impulse noise; and
   when a length of the other content is greater than or equal to an average word length for the annotated utterance,
      determining, with the electronic processor, based on the voice content, an intent portion of the annotated utterance and an entity portion of the annotated utterance;
      generating, with the electronic processor, a voice prompt based on the timing of the impulse noise and at least one of the group consisting of a timing of the intent portion and a timing of the entity portion; and
      playing, with the electronic processor, the voice prompt via a speaker communicatively coupled to the electronic processor.

12. The method of claim 11, further comprising:
   generating the average word length for the annotated utterance by dividing a total length of the voice content by a number of words for the annotated utterance.

13. The method of claim 12, further comprising:
   receiving the number of words for the annotated utterance from a speech recognizer.

14. The method of claim 11, further comprising:
   determining whether a user intent is recognized based on the intent portion; and
   when the user intent is not recognized and the timing of the impulse noise corresponds to the timing of the intent portion,
      determining a potential intent based on the entity portion; and
      generating the voice prompt based on the potential intent.

15. The method of claim 14, wherein generating the voice prompt includes generating a request to repeat a word of the utterance based on the entity portion.

16. The method of claim 14, further comprising:
   when the user intent is not recognized and the timing of the impulse noise does not correspond to the timing of the intent portion, writing the entity portion to a memory communicatively coupled to the electronic processor; and
   generating the voice prompt includes generating a request to repeat the intent portion.

17. The method of claim 11, further comprising:
   determining whether a user intent can be recognized based on the intent portion; and
   when the user intent is recognized, generating the voice prompt to include a request to repeat a word of the utterance based on the entity portion.

18. The method of claim 17, wherein the request to repeat a word of the utterance includes a request to repeat the word based on at least one of the group consisting of a word immediately preceding the impulse noise, a word immediately following the impulse noise, and a word identified based on the timing of the impulse noise and the entity portion.

19. The method of claim 11, wherein the electronic processor is further configured to:
   determine whether a user intent can be recognized based on the intent portion; and
   when the user intent is recognized,
   detect a possible repetition portion of the entity portion based on the timing of the impulse noise; and
   generate an adjusted entity portion based on the entity portion and the possible repetition portion.

20. The method of claim 19, wherein the electronic processor is configured to generate the adjusted entity portion by removing an entity from the entity portion based on the possible repetition portion.

* * * * *